United States Patent [19]

Nomura et al.

[11] Patent Number: 5,654,600
[45] Date of Patent: Aug. 5, 1997

[54] MOTOR WITH RECESS FOR INDEX POSITION DETECTION

[75] Inventors: Tetsuya Nomura; Hirokazu Nakagawa, both of Furukawa; Kazuhiro Muramatsu, Okayama; Shigetoshi Kagomiya, Furukawa, all of Japan

[73] Assignee: Alps Electric Co., Ltd., Tokyo, Japan

[21] Appl. No.: 388,045

[22] Filed: Feb. 13, 1995

[30] Foreign Application Priority Data

Mar. 16, 1994 [JP] Japan ................. 6-072774

[51] Int. Cl.$^6$ ................................. H02K 11/00
[52] U.S. Cl. ................. 310/68 B; 310/156; 310/261
[58] Field of Search ................. 310/68 B, 156, 310/157, 261, 40 MM, DIG. 3, DIG. 6

[56] References Cited

U.S. PATENT DOCUMENTS

| | | | |
|---|---|---|---|
| 3,831,071 | 8/1974 | Mitsu | 318/254 |
| 4,364,005 | 12/1982 | Kohzai et al. | 322/31 |
| 5,095,238 | 3/1992 | Suzuki et al. | 310/156 |
| 5,233,296 | 8/1993 | Maeda et al. | 324/207.22 |
| 5,319,271 | 6/1994 | Shimada et al. | 310/68 B |

FOREIGN PATENT DOCUMENTS 61-214764  2/1987  Japan .
3-52546 A  3/1991  Japan .

*Primary Examiner*—Thomas M. Dougherty
*Assistant Examiner*—Jonathan Link
*Attorney, Agent, or Firm*—Guy W. Shoup; Patrick T. Bever

[57] ABSTRACT

The invention relates to a motor, and more particularly to a motor having means for detecting an index position. A rotor yoke of the motor is provided with a recess having a width greater than the width of each pole of a rotating magnet. Substantially the whole of one pole of the rotating magnet and a part of another pole adjacent to the one pole on the downstream side in terms of rotation of a rotor are exposed to the recess. The magnetic flux from the magnet exposed to the recess is detected by a Hall element disposed in opposition to the outer circumference of the rotor, thereby specifying the index position.

3 Claims, 10 Drawing Sheets

MOTOR WITH RECESS FOR INDEX POSITION DETECTION

BACKGROUND OF THE INVENTION

1. Field of the Invention

The present invention relates to a motor for use in a floppy disk drive or the like, and more particularly to an index detecting portion of the motor.

2. Description of the Related Art

In a motor for use in a floppy disk drive or the like, a reference rotational position of a rotor is detected, that is, an index position is detected.

Referring to FIGS. 20 and 21, there is shown a conventional motor including a rotor yoke 1, an index detecting magnet 2 mounted on the outer circumference of the rotor yoke 1 and adapted to rotate with the rotor yoke 1, and a magnetic sensor 3 such as a Hall element opposed to the outer circumference of the rotor yoke 1 for detecting magnetic flux generating from the index detecting magnet 2. A detection signal from the magnetic sensor 3 is input to a processing circuit (detecting circuit) (not shown), which in turn generates one index signal per revolution of the rotor. Reference numeral 4 in FIG. 20 denotes a stator provided with a coil (not shown). In FIG. 21, the stator 4 is not shown.

In the motor shown in FIGS. 20 and 21, the index detecting magnet 2 is necessary and the work for mounting the magnet 2 to the rotor yoke 1 is also necessary. Accordingly, there is a problem in size reduction and cost reduction of the motor and a device using the motor. To solve this problem, there has recently been proposed an improved motor having such a structure that a recess is formed on the side surface of a rotor yoke to expose a part of a magnet inside the rotor yoke, whereby magnetic flux from the magnet partially exposed to the recess is detected by a magnetic sensor to thereby perform index detection.

Referring to FIGS. 22 and 23, there is shown a rotor 8 of such an improved motor. The rotor 8 is provided with a rotor yoke 5 and a rotating magnet 6 having N poles and S poles axially magnetized at equal intervals. The rotor yoke 5 is formed with a rectangular recess 7 to which a part of the outer circumference of the rotating magnet 6 is exposed. As shown in FIG. 22, the poles of the rotating magnet 6 are such that when the upper side (front side) of the magnet 6 has an N pole, for example, the lower side of the magnet 6 (the side opposed to a stator not shown) has an S pole. In FIGS. 22 and 23, the poles of the magnet on the lower side are denoted by reference numerals 6a to 6d. The N pole 6b and the S pole 6c are exposed to the recess 7 partially to the same degree. The magnetic flux generating from the rotating magnet 6 partially exposed to the recess 7 is detected by a magnetic sensor (e.g., Hall element) provided in opposition to the outer circumference of the rotor yoke 5. The magnetic sensor detects a radial component of the magnetic flux generating from the rotating magnet 6. FIG. 24 shows a detection characteristic of the magnetic sensor (a change in magnetic flux density with time) when the rotor 8 is rotated in the direction depicted by an arrow A in FIG. 23. In FIG. 24, the upper side (plus side) represents magnetic flux directed from the center of the magnet 6 to the outside thereof, and the lower side (minus side) represents magnetic flux directed from the outside of the magnet 6 to the center thereof. Reference characters a to e in FIG. 24 denote magnetic flux densities at different positions shown by the corresponding reference characters in FIG. 23.

As apparent from FIG. 24, at the point b where the N pole 6b is opposed to the front of the magnetic sensor, a large output (magnetic flux density) on the plus side is obtained. At the boundary point (point c) between the N pole 6b and the S pole 6c, a zero output is obtained. When the rotor 8 is further rotated and the S pole 6c comes to a position opposed to the front of the magnetic sensor, a large output on the minus side is obtained (at the point d). Then, a processing circuit (not shown) connected to the magnetic sensor specifies the point c where the output is zero as an index position, thus detecting a rotational position of the rotor. That is, the point c where the output becomes zero after it exceeds a threshold Th is specified as the index position. The reason why the threshold Th is set is that while the magnetic sensor also detects the magnetic flux generating from a portion of the rotor yoke 5 where the recess 7 is not formed and generates a noise signal, this noise signal is intended to be distinguished from a signal based on the magnet exposed to the recess 7. The threshold Th can be set as a hysteresis width of a comparator in the processing circuit (not shown), that is, as a difference between an input voltage of the comparator where an output from the comparator changes from H level (e.g., 5 V) to L level (e.g., 0 V) and an input voltage where the output changes from L level to H level. The hysteresis width (threshold Th) is decided from a resistance of a resistor connected to the comparator.

In the motor shown in FIGS. 22 and 23, the S pole 6a adjacent to the N pole 6b on the upstream side in terms of rotation of the rotor 8 is not exposed to the recess 7. Accordingly, the magnetic flux directed from the N pole 6b to the S pole 6a is also leaked and it is also detected by the magnetic sensor as shown by the point a in FIG. 24. Then, a signal (overshoot) on the minus side indicating the magnetic flux directed to the center of the rotating magnet 6 is output at the point a. Similarly, the magnetic flux directed from the N pole 6d not exposed to the recess 7 to the S pole 6c exposed to the recess 7 is also detected by the magnetic sensor, and a signal (overshoot) on the plus side is output at the point e from the magnetic sensor. The signal levels of these overshoots are greater than the signal level of noise detected from the portion of the rotor yoke 5 where the recess 7 is not formed.

Further, there are variations in size and characteristic of each component of the motor including the magnetic sensor such as a Hall element, the rotor yoke 5, and the rotating magnet 6. There also occur variations in assembling of each component. In addition, there are variations in characteristic of the processing circuit. As a result, the combination of these variations causes a possibility that if a magnetic sensor having a good sensitivity is located close to the rotor yoke 5, the level at the point e may exceed the threshold Th. In this case, the processing circuit erroneously detects two index positions per revolution of the rotor. Conversely, if a magnetic sensor having a poor sensitivity is located apart from the rotor yoke 5, there is a possibility that the level at the point b may not exceed the threshold Th in the worst case, causing a problem that the index detection becomes impossible. As a method for solving these problems, it may be considered to set individual thresholds according to the variations in size of each component and the sensitivity of the magnetic sensor. However, this method requires adjustment of the individual thresholds in manufacturing the motor or equipment using the motor, causing a reduction in productivity of the equipment and an increase in cost.

SUMMARY OF THE INVENTION

It is accordingly an object of the present invention to provide a motor which can eliminate the need of adjustment of individual thresholds in the manufacturing steps and reliably detect an index position.

The width of a recess formed on a rotor yoke is set larger than the width of each pole of a rotating magnet. Substantially the whole of a first pole of the rotating magnet and a part of a second pole of the rotating magnet adjacent to the first pole on the downstream side in terms of rotation of a rotor are exposed to the recess. Accordingly, a large magnetic flux density (maximum magnetic flux density) can be obtained from the first pole, and the influence of overshoot and noise from the second pole can be relatively suppressed in magnitude as compared with the maximum magnetic flux density, so that the S/N ratio of an output from magnetic detecting means can be improved to thereby prevent erroneous index detection.

In an embodiment of the present invention, the magnetic detecting means comprises a detecting element disposed in opposition to the rotor yoke for detecting a radial component of magnetic flux generating from the rotating magnet, and the amount of exposure of the second pole to the recess is set within 46% of the width of each pole of the rotating magnet. With this arrangement, even if there are variations in the detecting element, other components of the motor, and a signal processing circuit of the detecting element, an S/N ratio that can absorb such variations can be obtained to thereby ensure the index detection.

In another embodiment of the present invention, the magnetic detecting means comprises a detecting element disposed in opposition to the rotor yoke for detecting a radial component of magnetic flux generating from the rotating magnet, and the recess of the rotor yoke has a nonrectangular shape including a trapezoidal shape. With this arrangement, the concentration of the radial component of magnetic flux near the recess can be suppressed to thereby further reduce the level of the overshoot from the second pole.

Other objects and features of the invention will be more fully understood from the following detailed description and appended claims when taken with the accompanying drawings.

BRIEF DESCRIPTION OF THE DRAWINGS

FIG. 6b is a graph showing an index signal in correspondence to FIG. 6a;

FIG. 10b is a characteristic graph showing a change in overshoot magnetic flux density in FIG. 10a;

DETAILED DESCRIPTION OF THE PREFERRED EMBODIMENTS

Figure 1:
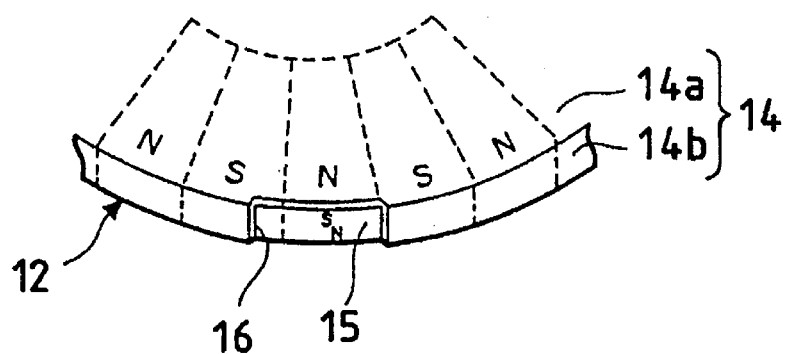
FIG. 1 is a perspective view of an essential part of a rotor provided in a motor according to a first preferred embodiment of the present invention.

A motor according to a first preferred embodiment of the present invention will be described with reference to FIGS. 1 to 11.

The motor according to the first preferred embodiment of the present invention is a face opposition type of three-phase brushless motor generally composed of a stator 10 formed with a coil (not shown), a ring-shaped ball bearing (thrust bearing) 11 mounted on the stator 10, a rotatable rotor 12 opposed to the stator 10 with the ball bearing 11 interposed therebetween, and a Hall element 13 as magnetic detecting means mounted on the stator 10 so as to be opposed to the outer circumference of the rotor 12 in the radial direction thereof.

Although the details of the stator 10 are not shown, the stator 10 includes a stator yoke as a base formed from a silicon steel plate of a ferromagnetic material having a thickness of 0.5 mm. The stator yoke is entirely covered with a first insulating layer. There are formed on the first insulating layer an FG pattern for detecting a rotating speed of the motor, the Hall element 13, an IC constituting a detecting circuit of the Hall element 13, a driving circuit of the motor, etc., a land for soldering circuit parts such as a fixed resistor, and a copper foil pattern such as a wiring pattern. The copper foil pattern except necessary parts such as the soldering land is covered with a second insulating layer. In this manner, the stator 10 serves also as a printed wiring board. Further,. the coil (not shown) for rotating the rotor 12 is mounted on the second insulating layer by soldering and a double-sided adhesive tape. The stator 10 is fixed by screws (not shown) to a metal chassis (a chassis of a floppy disk drive) 20 on which the motor is mounted, thereby preventing deformation of the stator 10 due to an attractive force of a rotating magnet 15 which will be hereinafter described.

The ball bearing 11 is composed of a plurality of small metal balls 11a, a ball retainer 11b formed of a synthetic resin for circumferentially rotatably retaining the balls 11a, a first ring-shaped smooth plate 11c disposed under the ball retainer 11b (on the stator side) and kept in contact with the balls 11a, and a second ring-shaped metal smooth plate 11d disposed over the ball retainer 11b and kept in contact with the balls 11a so as to be rotatable with the rotor 12.

The rotor 12 is composed of a rotor yoke 14 formed from a galvanized steel plate of a ferromagnetic material and configured in a sectionally inverted U-shape, and a ring-shaped rotating magnet (field magnet) 15 mounted on the rotor yoke 14 by an adhesive and a magnetically attractive force of the rotating magnet 15. The attractive force always acts between the rotating magnet 15 and the stator yoke of the stator 10. The ball bearing 11 functions to allow smooth rotation of the rotor 12 through the contact of the first smooth plate 11c with the stator 10 and the contact of the second smooth plate 11d with the rotor 12. A hollow bearing 17 serving as a guide for the ball bearing 11 in the rotational direction thereof is mounted on the chassis 20 by crimping. The bearing 17 is inserted through a circular hole of the stator 10 and projects upward from the stator 10. The inner circumference of the ball bearing 11 (the ball retainer 11b and the first smooth plate 11c) is clearance-fitted with the outer circumference of the bearing 17, thereby allowing the ball bearing 11 to rotate about the bearing 17.

A rotating shaft 18 is inserted through the chassis 20 from the lower side thereof (the side where the stator 10 is not mounted) so as to be clearance-fitted with a hollow portion of the bearing 17. The rotating shaft 18 is fixed by a screw 19 inserted thereinto from the upper side of the rotor yoke 14 with the second smooth plate 11d and the rotor yoke 14 sandwiched therebetween, thus allowing rotation of the rotating shaft 18 with the rotor 12. Although the ball bearing 11 is shown so as not to surround the bearing 17 in FIG. 2 for the purpose of better understanding the rotational mechanism of the rotor 12, the ball bearing 11 actually surrounds the outer circumference of the bearing 17.

Figure 2:
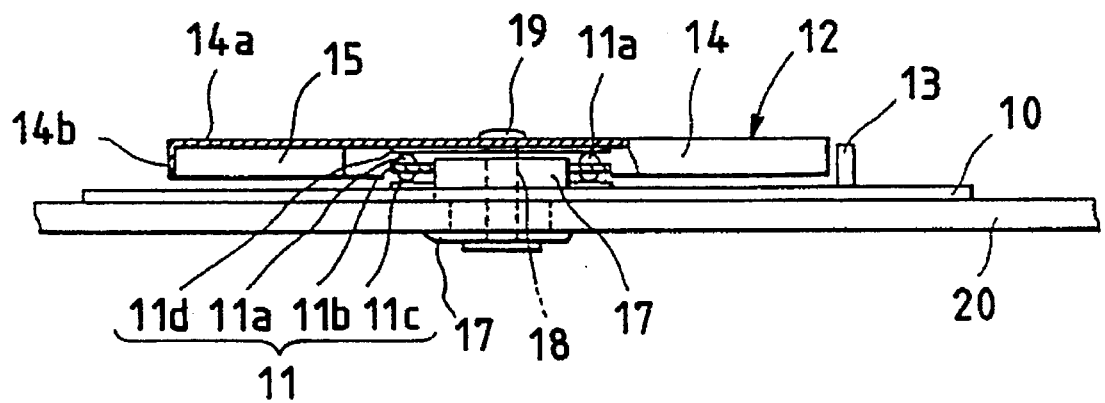
FIG. 2 is a side view of the motor according to the first preferred embodiment with a rotor yoke and a rotating magnet partially cut away to allow the inside of the rotor to appear.
Figure 3:
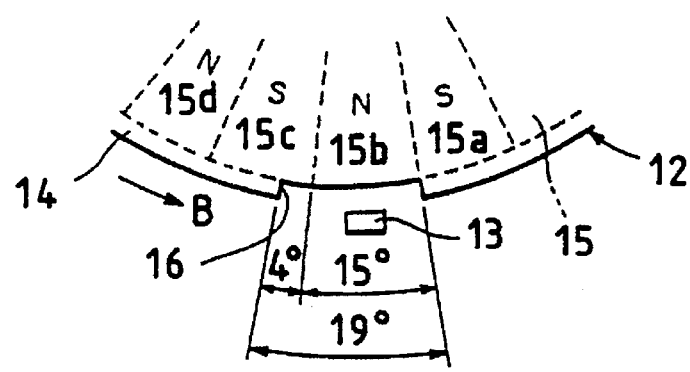
FIG. 3 is a fragmentary plan view of the rotor shown in FIG. 1.
Figure 22:
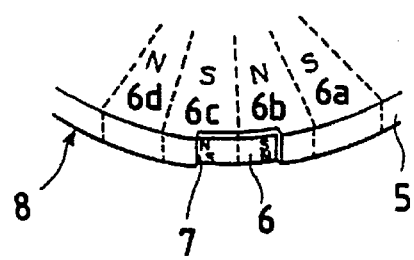
FIG. 22 is a perspective view of an essential part of a rotor provided in a conventional motor improved.
Figure 23:
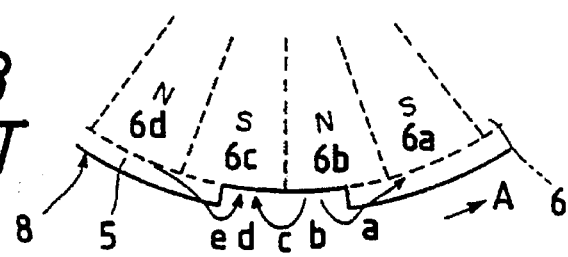
FIG. 23 is a fragmentary plan view of the rotor shown in FIG. 22.
Figure 24:
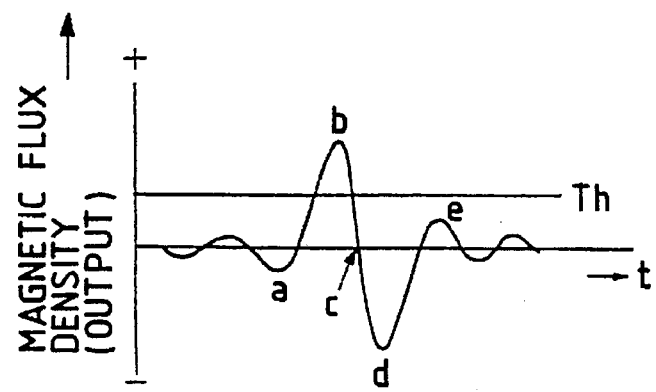
FIG. 24 is a graph showing the magnetic detection characteristic when the rotor shown in FIG. 22 is rotated.

As shown in FIGS. 1 to 3, the rotor yoke 14 is provided with a top surface 14a and a side surface 14b perpendicularly bent from the top surface 14a. The side surface 14b is formed with a recess 16 having a rectangular shape as viewed in side elevation. The recess 16 has a width corresponding to a central angle of 19 deg of the rotating magnet 15, thereby exposing a part of the rotating magnet 15. The rotating magnet 15 is a 24-pole ferrite magnet having N poles and S poles alternately arranged so that each pole has a central angle of 15 deg. Like the related art rotor yoke shown in FIGS. 22 and 23, the rotating magnet 15 is magnetized in the axial direction thereof and has polarities different between the upper side and the lower side of the magnet. An N pole 15b is exposed to the recess 16 at a full angle of 15 deg and an S pole 15c adjacent to the N pole 15b on the downstream side in terms of rotation of the rotor is exposed to the recess 16 at a partial angle of 4 deg. The Hall element 13 is opposed to the outer circumference of the rotor yoke 14 (the recess 16). In FIGS. 1 to 4, each pole of the magnet is shown by a broken line, and the polarity of the magnet 15 shown represents a polarity on the lower side of the magnet 15.

The Hall element 13 is mounted on the stator 10 by soldering in such a manner that a detecting surface (not shown) in a package of the Hall element 13 perpendicularly intersects a phantom line extended from the radius of the rotating magnet 15, so as to detect a radial component of magnetic flux generating from the rotating magnet 15. Further, a collecting yoke (not shown) formed of a ferromagnetic material such as ferrite is provided on a front surface and a rear surface of an actual detecting portion in the package of the Hall element 13, so as to collect the magnetic flux.

The rotating magnet 15 has an outer diameter (radius) of 33 mm and a thickness of 2.4 mm. The distance from the upper surface of the stator yoke of the stator 10 to the lower surface of the rotating magnet 15 is set to 1.07 mm. The rotor yoke 14 has a thickness of 0.8 mm and an outer diameter (radius) of 33.9 mm. The distance from the center of the rotor to the center of the actual detecting portion of the Hall element 13 is set to 35 mm. The distance from the lower surface of the rotating magnet 15 to the center of the detecting portion of the Hall element 13 is set to 1.3 mm.

Figure 5:
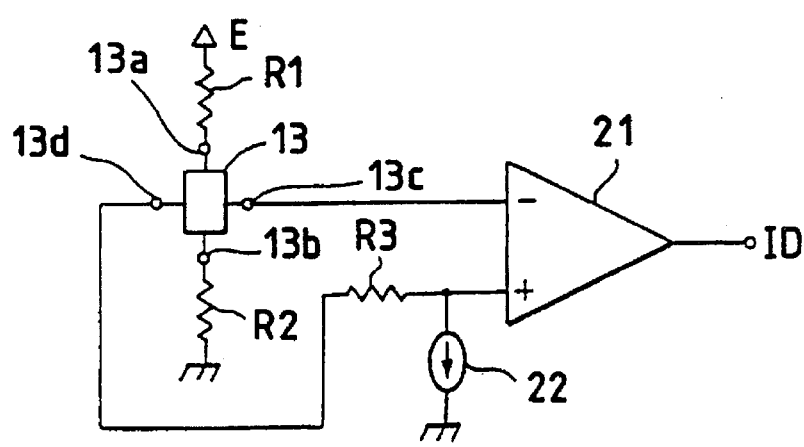
FIG. 5 is a diagram of a detecting circuit (processing circuit) to which magnetic detecting means provided in the motor shown in FIG. 2 is connected.

As shown in FIG. 5, the Hall element 13 is provided with a pair of terminals (input terminals) 13a and 13b for allowing a Hall bias current to flow and a pair of terminals (output terminals) 13c and 13d for obtaining an output voltage (Hall output) of the Hall element 13. The input terminal 13a is connected through a bias resistor R1 to a voltage supply E of 5 V, and the input terminal 13b is grounded through a bias resistor R2 to a ground potential. The output terminal 13c is connected to an inverting input terminal of a comparator 21, and the output terminal 13d is connected through a hysteresis width setting resistor R3 to a noninverting input terminal of the comparator 21. A connection point between the noninverting input terminal of the comparator 21 and the hysteresis width setting resistor R3 is connected to a current input side of a hysteresis setting constant current source 22, and a current output side of the hysteresis setting constant current source 22 is grounded. An index pulse (signal) is obtained from an output terminal of the comparator 21. The comparator 21 and the constant current source 22 are constructed as an IC together with a driving circuit of the motor. The constant current source 22 is adapted to operate so that when the noninverting input terminal of the comparator 21 is in L level, a constant current Ih flows, whereas when the noninverting input terminal is in H level, the constant current Ih does not flow. The hysteresis width (threshold Th) is determined according to a resistance of the hysteresis width setting resistor R3 mounted to the IC.

Figure 4:
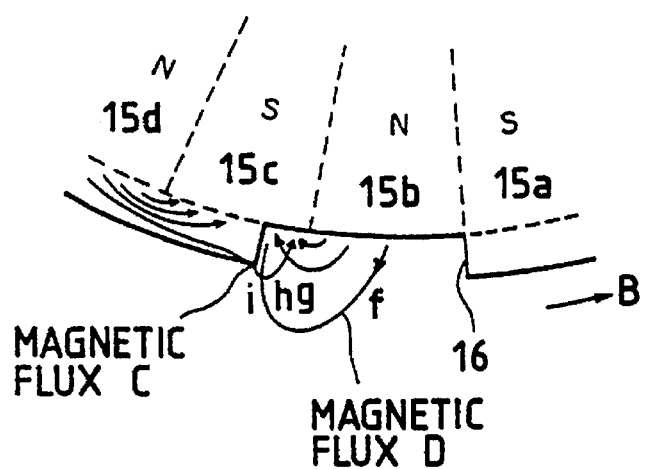
FIG. 4 is an enlarged plan view of the rotor shown in FIG. 1, illustrating a magnetic flux distribution.
Figure 6A:
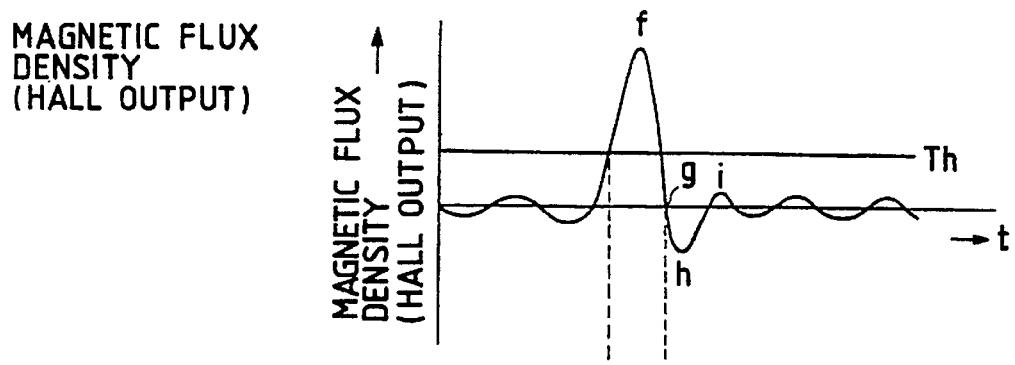
FIG. 6a is a graph showing the detection characteristic of the magnetic detecting means when the rotor shown in FIG. 1 is rotated.
Figure 7:
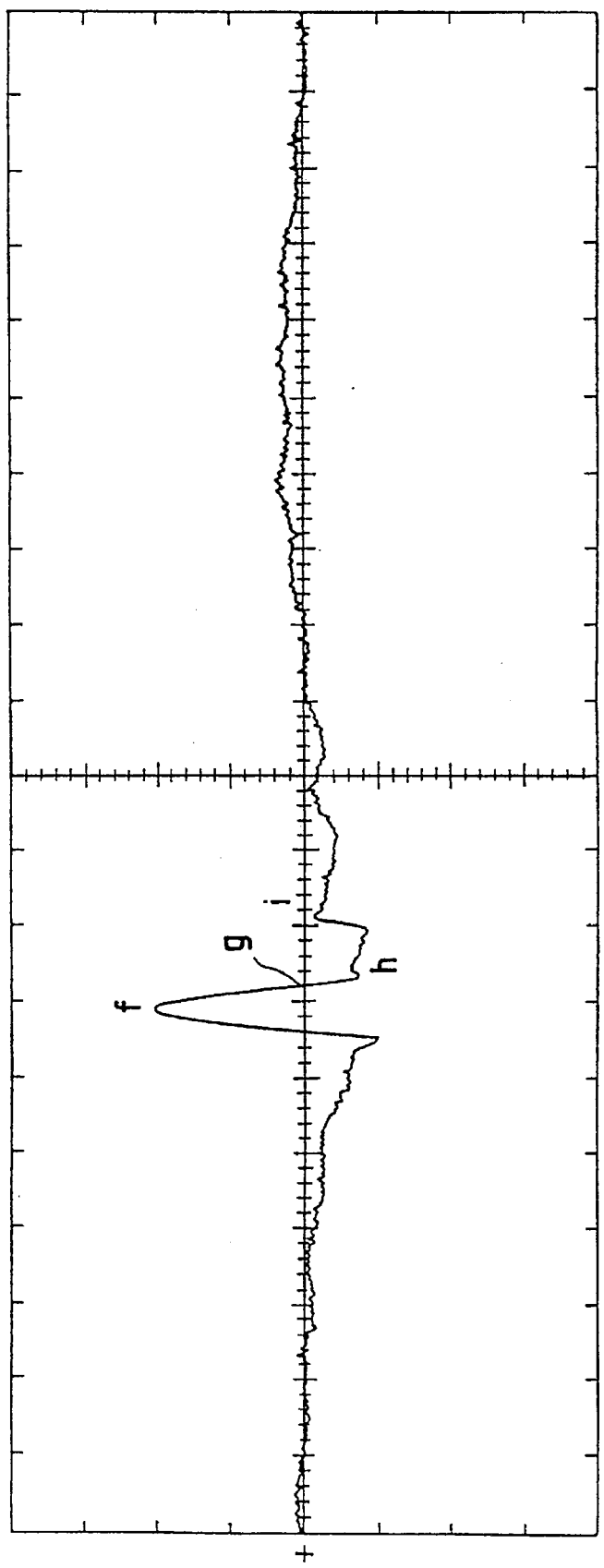
FIG. 7 is a graph showing the detection characteristic of the magnetic detecting means by observation when the rotor shown in FIG. 1 is rotated.

In the motor according to the first preferred embodiment mentioned above, when a current is allowed to flow through the coil (not shown) on the stator 10 and thereby the rotor 12 is rotated at a constant speed in a direction depicted by an arrow B in FIG. 4, a detection characteristic as shown in FIG. 6a is obtained from the Hall element 13. Specifically, at a point f where the N pole 15b faces the front surface of the Hall element 13, a large output (magnetic flux density) on the plus side (i.e., the side where the magnetic flux is directed from the center of the rotating magnet 15 to the outside thereof) is obtained. At a boundary point (point g) between the N pole 15b and the S pole 15c, a zero output is obtained. At a point h where the S pole 15c faces the front surface of the Hall element 13, an output on the minus side (i.e., the side where the magnetic flux is directed from the outside of the rotating magnet 15 to the center thereof) is obtained. At a point i where an end of the recess 16 to which a part of the S pole 15c is exposed faces the front surface of the Hall element 13, magnetic flux C generating from an N pole 15d adjacent to the S pole 15c on the downstream side and reaching the S pole 15c is detected to obtain a slight output on the plus side. Thus, the magnetic flux C jumping from the rotor yoke 14 to the outside of the rotating magnet 15 causes an overshoot. However, as a large part of the S pole 15c is covered with the rotor yoke 14, most of the magnetic flux C passes in the rotor yoke 14 having a small reluctance, and the magnetic flux C is hardly detected by the Hall element 13 in actual. Magnetic flux D generating from the N pole 15b and entering the S pole 15c is rather most detected by the Hall element 13, resulting in the output on the minus side to be detected at the point i. This result is also confirmed by simulation. The result of simulation Shows the point f: 132 G (gauss), the point h: −27 G, and the point i: −1.6 G. FIG. 7 shows a detection characteristic obtained by observation. As apparent from FIG. 7, the output on the minus side is detected at the point i, which is similar to the result of simulation.

Figure 6B:

As shown in FIG. 6b, the index signal obtained from the output terminal of the comparator 21 changes from H level to L level when the output (Hall output) obtained from the Hall element 13 reaches the threshold Th, and the index signal changes from L level to H level at a zero cross point (point g) where the output becomes zero. This zero cross point where the index pulse rises from L level to H level is defined as an index position of the motor. That is, the point g where the Hall output (magnetic flux density) becomes zero after once exceeding the threshold Th is defined as the index position.

According to the first preferred embodiment of the present invention mentioned above, since the N pole 15b is entirely exposed to the recess 16, a large output on the plus side is obtained from the Hall element 13 at the point f. Further, since the S pole 15c is partially exposed to the recess 16, an output on the minus side is obtained at the point h. Accordingly, the zero cross point (point g) can be securely obtained, and the output at the point i can be made greatly smaller than the output at the point f. Therefore, an S/N ratio can be improved. Further, even if there are variations in sensitivity of the Hall element 13, size of each component of the motor including the rotor yoke 14 and the rotating magnet 15, and characteristic of the detecting circuit shown in FIG. 5, it is unnecessary to adjust individual thresholds in the manufacturing steps, and only the output at the point f can be detected by properly setting the threshold Th because the output at the point i is on the minus side. As a result, one index per revolution of the rotor can be securely detected.

Further, since the Hall element 13 is provided with the collecting yoke formed of a ferromagnetic material such as ferrite, the magnetic flux is collected to the detecting portion of the Hall element 13 by the collecting yoke, thereby obtaining a large output from the Hall element 13. Therefore, noise can be more suppressed as compared with the case where a Hall element with no collecting yoke is used.

Although the angle of the recess 18 is set to 19 deg in the first preferred embodiment, this angle is not limited to 19 deg according to the present invention. An allowable range of the angle of the recess 16 was obtained by simulation employing a finite element method.

Figure 8:
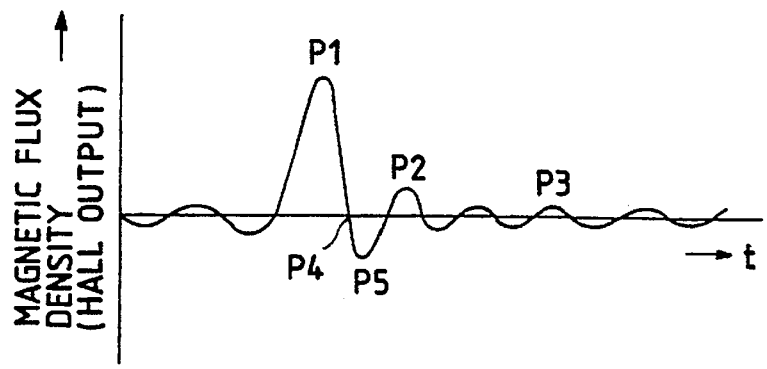
FIG. 8 is a graph showing the magnetic detection characteristic of a Hall element in the motor according to the first preferred embodiment of the present invention.

In the motor according to the first preferred embodiment shown in FIGS. 1 to 3, the magnetic flux density applied to the Hall element 13 and the output voltage (Hall output) from the Hall element 13 during rotation of the rotor 12 at a constant speed are shown in FIG. 8 with the horizontal axis denoting time (rotational angle). In FIG. 8, P1 denotes a point where the magnetic flux density is maximum (corresponding to the point f shown in FIG. 4); P2 denotes a point where overshoot appears (corresponding to the point i shown in FIG. 4); and P3 denotes a point where there appears noise due to the rotating magnet 15 at an unrecessed portion thereof. A reference value of the magnetic flux density at the central point of the Hall element 13 is 132 G (gauss) at the point P1 and a noise component (at the point P3) is 2 G when an ambient temperature Ta is 25° C. The overshoot is smaller than the noise component. These values of the magnetic flux density represent values of a radial component of the magnetic flux density unless otherwise specified hereinafter.

These values vary with a change in ambient temperature, and also largely vary with variations in sizes of the rotor 12, the stator 10, the Hall element 13, etc. including the sizes of setting thereof and variations in characteristics (e.g., remanent magnetic flux density) of the rotating magnet 15. In consideration of these variations, simulation was performed to show that the minimum value or the worst value of the magnetic flux density at the point P1 was 103 G when the highest value of an assumed operation temperature Ta was 50° C. Further, the simulation shows that the maximum value or the worst value of the noise component at the point P3 was 8.9 G when the lowest value of the assumed operation temperature Ta was 0° C. Also in this case, the overshoot at the point P2 is smaller than the noise component. Further, there are variations in characteristics of the Hall element 13 such as sensitivity, variations in resistance values of the bias resistors R1 and R2, and variations in voltage value of the voltage supply E. In consideration of these variations, the worst value (the minimum value) V1 of the output voltage between the output terminals 13c and 13d of the Hall element 13 at the point P1 was 73 mV when Ta=50° C., and the worst value (the maximum value) V2 at the point P3 was 16.3 mV when Ta=0° C. as the result of simulation. Thus, the ratio V1/V2 was about 4.5.

The hysteresis width Vh (the threshold Th) can be decided from the resistance of the hysteresis width setting resistor R3 in the detecting circuit shown in FIG. 5 as mentioned above. This is true only when a hysteresis setting current Ih flowing from the hysteresis setting current source 22 is constant. Exactly, the hysteresis width Vh is decided from the product of the resistance of the hysteresis width setting resistor R3 and the hysteresis setting current Ih. The hysteresis setting current Ih is decided from the electrical characteristics of the IC. In general, the hysteresis setting current Ih varies about three times in such a manner that when a reference value is 10 μA, the minimum value is 5 μA and the maximum value is 15 μA. As a result, it may be considered that the hysteresis width Vh also varies about three times.

In this manner, when the angle of the recess 18 is 19 deg, the ratio V1/V2 is about 4.5 and the hysteresis width varies three times, so that there is a room of 1.5 (4.5/3) times. In other words, even when the magnetic flux density at the point P1 becomes 1/1.5 times the present value, or a larger one of the magnetic flux densities at the point P2 and the point P3 becomes 1.5 times the present value, the magnetic flux density obtained is allowable. The allowable range of the magnetic flux density was obtained by simulation with the angle of the recess 18 used as a parameter. In performing the simulation, it was assumed that the relation (the rate of change) between the reference value and the worst value of the magnetic flux density is fixed irrespective of a change in the angle of the recess 16, and the reference values of all components of the motor, such as the rotor 12, were used.

Figure 9A:
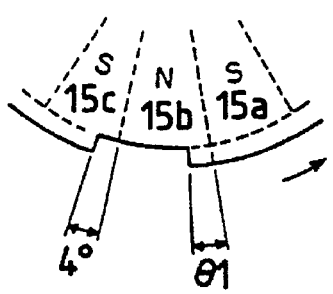
FIG. 9a is a fragmentary plan view of the rotor shown in FIG. 1, illustrating a change in position $\theta 1$ on the upstream side of a recess of the rotor.
Figure 9B:
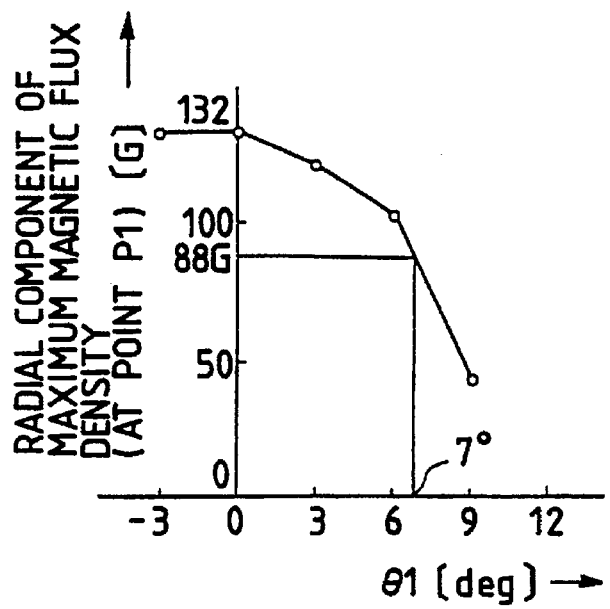
FIG. 9b is a characteristic graph showing a change in maximum magnetic flux density in FIG. 9b.
Figure 10A:
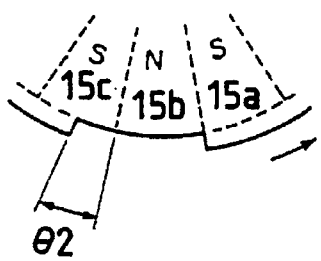
FIG. 10a is a fragmentary plan view of the rotor shown in FIG. 1, illustrating a change in position $\theta 2$ on the downstream side of the recess of the rotor with an N pole being exposed at its whole angle of 15 deg to the recess.
Figure 10B:
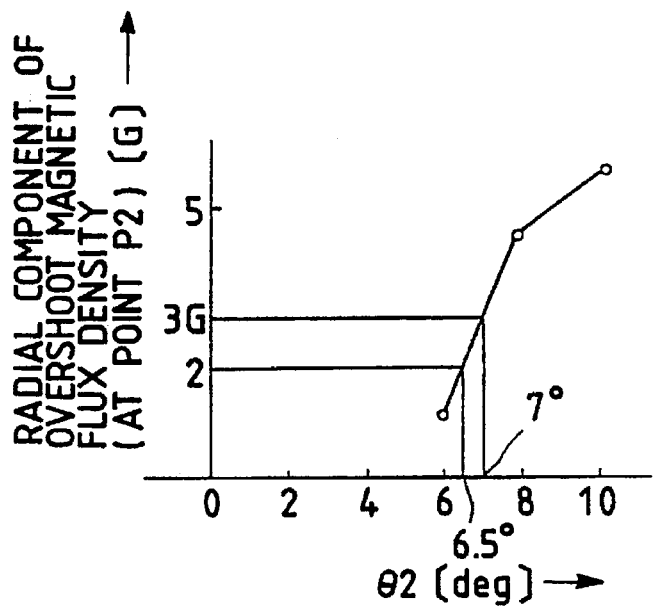

The magnetic flux density at the central point of the Hall element 13 is 132 G as the reference value at the point P1 as mentioned above. Accordingly, in the case where the overshoot and the noise component at the points P2 and P3 are 2 G as a fixed value, the allowable range of the magnetic flux density at the point P1 is greater than or equal to 132/1.5=88 G. As shown in FIG. 9b, the angle θ 1 corresponding to the magnetic flux density of 88 G was 7 deg.

Further, the reference value of the noise component at the central point of the Hall element 13 is 2 G. Accordingly, when the magnetic flux density at the point P1 is 132 G, the allowable range of the noise component or the overshoot is less than or equal to 2×1.5=3 G. As apparent from FIG. 10b, when the angle θ 2 becomes about 6 deg, the overshoot can be confirmed. At the angle θ 2 of 6.5 deg, the overshoot magnetic flux density becomes 2 G, which is the same value of the noise component. The angle θ 2 corresponding to the magnetic flux density of 3 G was 7 deg. In this case, since the noise component does not change irrespective of a change in the angle θ 2 of exposure of the S pole 15c, the overshoot was remarked and the angle θ 2 corresponding to the overshoot of 3 G was obtained.

Figure 11:
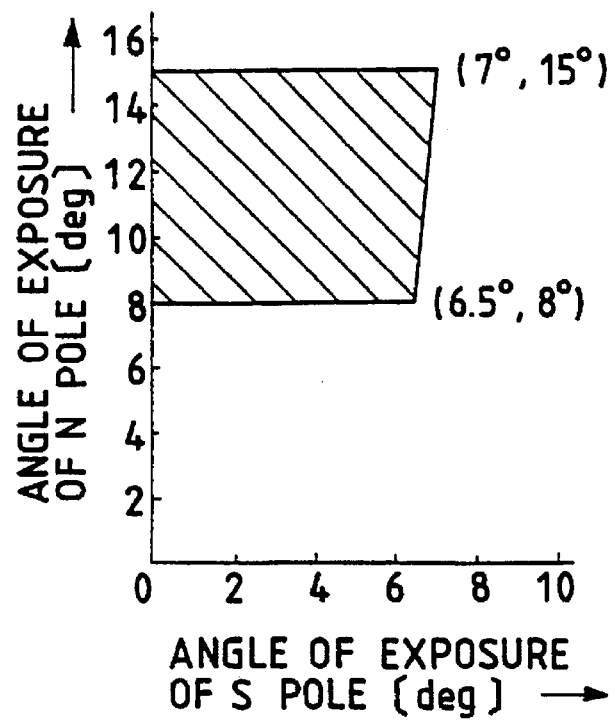
FIG. 11 is a graph summarized from the results of FIGS. 9a to 10b to show the allowable ranges of exposure angles of N and S poles.

In FIG. 11, the allowable range of the angles of exposure of the N and S poles are shown by a hatched portion. The exposure angle of the N pole 15b may range from 8 deg to 15 deg. When the N pole 15b is exposed at its whole angle of 15 deg to the recess 16, it is sufficient that the exposure angle of the S pole adjacent to the N pole 15b on either the upstream side or the downstream side in terms of rotation of the rotating magnet 15 is to be less than or equal to 7 deg. In other words, the allowable maximum angle of exposure of the rotating magnet 15 to the recess 16 is 29 deg corresponding to the total angle of substantially two poles of the magnet. Further, when the exposure angle of the N pole 15b is 8 deg, the exposure angle of the S pole 15c adjacent to the N pole 15b must be less than or equal to 6.5 deg at which the overshoot magnetic flux density is equal to the noise component.

In this manner, according to the result of this simulation, it can be said that the S pole 15c adjacent to the N pole 15b on the downstream side may not be exposed to the recess 16 at all provided that the N pole 15b is exposed to the recess 16 at an angle greater than or equal to 8 deg (i.e., the angle θ 2 may be equal to 0 deg). However, this is the result in the case where the magnetic flux density at the point P1 and the magnetic flux density at the point P2 or P3 are compared only in magnitude with each other. If the S pole 15c is not exposed at all, the magnetic flux density at the point P5 becomes the minus side in the simulation, but the value of the magnetic flux density is very small. Therefore, in an actual motor, the zero cross point (the point P4 shown in FIG. 8) cannot be obtained because of noise or the like, with the result that there is a possibility of index detection not being accurately performed. Accordingly, it is necessary to expose the S pole 18c to the recess 16, and the allowable range of the exposure angle of the S pole 15c when the N pole 15b is wholly exposed is less than or equal to 7 deg according to the result of simulation. Further, it is sufficient that the exposure angle of the N pole 15b is greater than or equal to 8 deg according to the result of simulation; however, the greater the exposure angle, the greater the magnetic flux density at the point P1. Accordingly, it is preferable that the N pole 15b is exposed at the whole angle of 15 deg to the recess 16.

As similar to the S pole 15c adjacent to the N pole 15b on the downstream side, the S pole 15a adjacent to the N pole 15b on the upstream side is allowed to have an exposure angle of 7 deg at the maximum to the recess 18 when the N pole 15b is entirely exposed to the recess 16 according to the result of simulation. However, since no zero cross point may be obtained on the upstream side of the N pole 15b, the exposure angle of the S pole 15a to the recess 16 may be 0 deg. Preferably, the exposure angle of the S pole 15a is greater than or equal to 2 deg (and less than or equal to 7 deg) in consideration of the fact that the N pole 15b is entirely exposed to the recess 16 also when the variations in individual sizes of the rotating magnet 15 and the rotor yoke 14 and the variations in setting thereof become worst within a tolerance.

In summary, it is necessary to expose the N pole 15b at its substantially whole angle of 15 deg to the recess 16 and also expose the S pole 15c adjacent to the N pole 15b on the downstream side to the recess 16. It is preferable to set the exposure angle of the S pole 15c to a value within 7 deg or within 46% in proportion to the width (angle) of one pole. With this setting of the amount of exposure of the rotating magnet 15 to the recess 16, the following effects can be obtained. That is, since the N pole 15b is substantially entirely exposed to the recess 16, a large magnetic flux density at the point P1 can be detected by the Hall element 13. Further, since the S pole 15c adjacent to the N pole 15b on the downstream side is exposed to the recess 16, the output at the point P5 always becomes the minus side to securely obtain a zero cross point (the point P4). Further, since the amount of exposure of the S pole 15c is set within 7 deg (46% in proportion), it is possible to obtain an S/N ratio that can absorb variations in size of each component of the motor including the size in setting, variations in characteristic of each component including the sensitivity characteristic of the Hall element 13, variations in the detecting circuit such as those in hysteresis setting current, and a change in ambient temperature. That is, the ratio of the magnetic flux density at the point P1 to the noise component and the overshoot can be obtained to eliminate the need of adjustment of individual thresholds and allow reliable index detection.

In the motor according to the first preferred embodiment of the present invention and the simulation shown in FIGS. 8 to 11, substantially the whole of an N pole in the polarity on the lower side of the rotating magnet 15 is exposed to the recess 16, and a part of an S pole adjacent to this N pole on the downstream side is exposed to the recess 16. As a modification, by suitably selecting the output terminal of the Hall element 13, substantially the whole of an S pole and a part of an N pole adjacent to this S pole on the downstream side may be exposed to the recess 16. Also in this case, a similar effect can be obtained.

Now, a motor according to a second preferred embodiment of the present invention will be described with reference to FIGS. 12 and 13, in which the same parts as those in the first preferred embodiment are denoted by the same reference numerals and the explanation thereof will be omitted.

As similar to the first preferred embodiment, the N and S poles of the rotating magnet 15 of the motor according to the second preferred embodiment are alternately arranged so that each pole has a central angle of 15 deg and is axially magnetized. Further, a part of the rotating magnet 15 is exposed to the recess 16 provided in the rotor yoke 14, and the magnetic flux (radial component) from the rotating magnet 15 is detected by the Hall element 13 opposed to the rotor 12.

Figure 12:
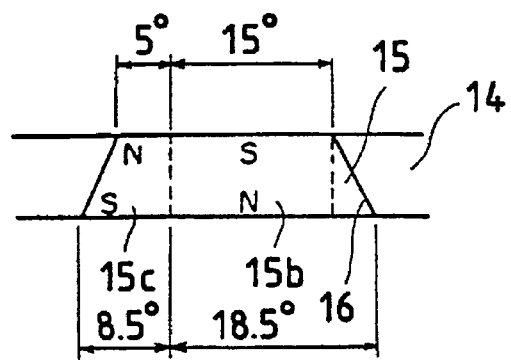
FIG. 12 is a side view of an essential part showing a recess of a rotor according to a second preferred embodiment of the present invention.
Figure 13A:
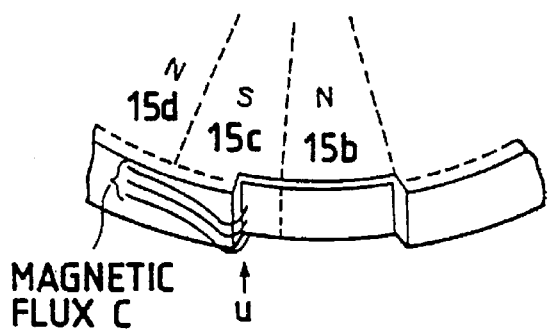
FIG. 13a is a perspective view of the rotor according to the first preferred embodiment, illustrating a magnetic flux distribution by the shape (rectangular in side elevation) of the recess.
Figure 13B:
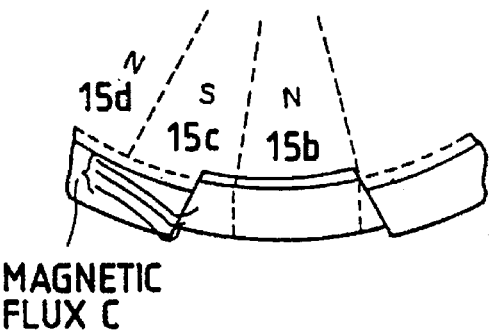
FIG. 13b is a perspective view of the rotor according to the second preferred embodiment, illustrating a magnetic flux distribution by the shape (trapezoidal in side elevation) of the recess.

As shown in FIG. 12, the recess 18 has a trapezoidal shape longer on the lower side than the upper side as viewed in side elevation. The whole of the N pole 15b and a part of the S pole 15c adjacent to the N pole 15b on the downstream side are exposed to the recess 16. The angle of the recess 18 on its upper side (the angle on the rotating magnet 15 as viewed in plan, that is, the angle corresponding to the angle shown in FIG. 3) is set to 20 deg in such a manner that the angle on the N pole 15b side is set to 15 deg and the angle on the S pole 15c side is set to 5 deg. The angle of the recess 16 on its lower side is set larger than that on the upper side, for example, set to 27 deg.

If the shape of the recess 16 is rectangular in side elevation as in the first preferred embodiment and the width (angle) of the recess 16 is increased in such a manner that the amount of exposure of the S pole 15c becomes 8.5 deg, the output from the Hall element 13 at the point i shown in FIG. 6a, i.e., near the downstream end of the recess 16, becomes the plus side and the output value (overshoot) is increased. To the contrary, the trapezoidal shape of the recess 16 as viewed in side elevation shown in FIG. 12 allows the overshoot on the plus side at the point i to be suppressed. This is due to the following fact. In the rectangular shape of the recess 16 as viewed in side elevation shown in FIG. 13a, the magnetic flux C generating from the N pole 15d and reaching the S pole 15c is concentrated at the end (point u) of the recess 16. To the contrary, in the trapezoidal shape of the recess 16 as viewed in side elevation shown in FIG. 13b, the magnetic flux C is dispersed.

In the second preferred embodiment of the present invention mentioned above, since the N pole 15b is exposed at the whole angle of 15 deg to the recess 16, a large output (magnetic flux density) can be obtained from the Hall element at a position opposed to the front surface of the N pole 15b. Further, since the shape of the recess 16 is trapezoidal in side elevation and at least the downstream end of the recess 16 is inclined, the concentration of the magnetic flux can be prevented to thereby suppress the level of the overshoot. Accordingly, the ratio of the magnetic flux density to the overshoot (S/N ratio) can be sufficiently obtained. Further, by suitably setting the threshold Th, the need of adjustment of individual thresholds can be eliminated and one index signal per revolution of the rotor can be reliably detected.

Further, since the level of the overshoot can be suppressed, the exposure angle of the S pole 15c can be increased, so that a large output on the minus side at the point h shown in FIG. 6a can be obtained to thereby more reliably detect a zero cross point. Even when the amount of exposure of the S pole 15c is enlarged because of variations in working of the rotor yoke 14, variations in assembling of the rotor yoke 14 and the rotating magnet 15, etc., the output value on the plus side at the point i, i.e., the overshoot, can be suppressed. Therefore, the recess 16 is allowed to have a room larger than that from the result of simulation described in the first preferred embodiment, thereby more improving the assemblability and workability of the motor.

Figure 14A:
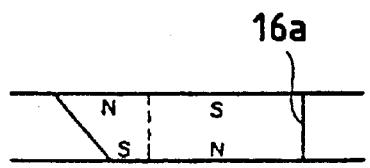
FIGS. 14a, 14b, and 14c are side elevations of essential parts, illustrating various modifications of the recess according to the second preferred embodiment.
Figure 14B:
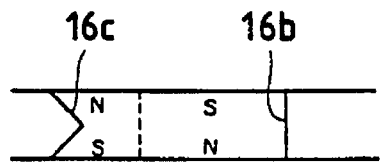
Figure 14C:
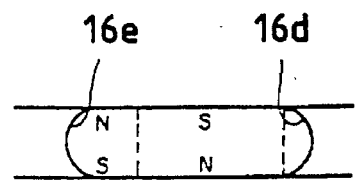
Figure 15:
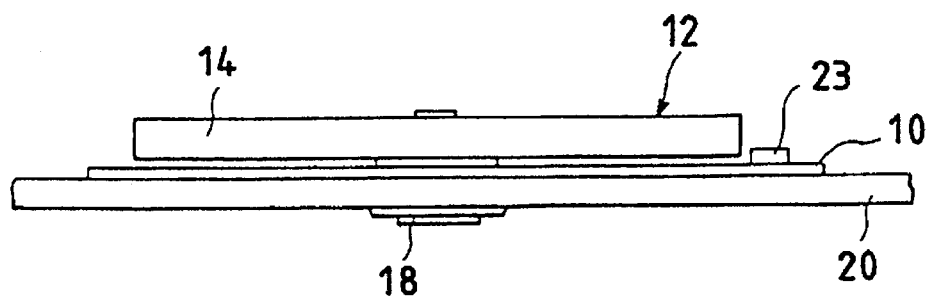
FIG. 15 is a side view of a motor according to a third preferred embodiment of the present invention.

It is to be noted that the shape of the recess 16 shown in FIG. 12 is merely illustrative and other modifications may be made as shown in FIGS. 14a, 14b, and 14c. The shape of the recess 16 shown in FIG. 14a is trapezoidal in side elevation in such a manner that the upper side is longer than the lower side and an end 16a of the recess 16 on the upstream side in terms of rotation of the rotor is perpendicular to both the upper side and the lower side. The shape of the recess 16 shown in FIG. 14b is such that an upstream end 16b of the recess 16 is perpendicular to both the upper side and the lower side and a downstream end 16c of the recess 16 is horizontally V-shaped so as to be recessed in the upstream direction. The shape of the recess 16 shown in FIG. 14c is similar to an oval shape such that an upstream end 16d of the recess 16 is arc-shaped so as to be recessed in the upstream direction and a downstream end 16e of the recess 16 is also arc-shaped so as to be recessed in the downstream direction.

Also in the motor having the nonrectangular recess 16 as shown in FIGS. 14a to 14c, at least the downstream end of the recess 16 is not perpendicular to the upper and lower sides of the recess 16. Therefore, the overshoot on the plus side causing a problem can be suppressed to improve the S/N ratio and obtain an effect similar to that of the second preferred embodiment mentioned above.

Now, a motor according to a third preferred embodiment of the present invention will be described with reference to FIGS. 15 to 19, in which the same parts as those in the first preferred embodiment are denoted by the same reference numerals and the explanation thereof will be omitted. A Hall element 23 in the third preferred embodiment is provided on the stator 10 so as to be opposed to the outer circumference of the rotor 12. Specifically, the Hall element 23 is mounted on the stator 10 by soldering in such a manner that a detecting surface (not shown) inside a package of the Hall element 23 is parallel to a surface of rotation (rotational surface) of the rotor 12, so as to detect a vertical component (as in FIG. 15) of the magnetic flux generating from the rotating magnet 15, i.e., a component perpendicular to the rotational surface of the rotor 12. Further, the Hall element 23 includes a collecting yoke (not shown) for collecting the magnetic flux to a detecting portion like the Hall element 13 in the first preferred embodiment.

Figure 16:
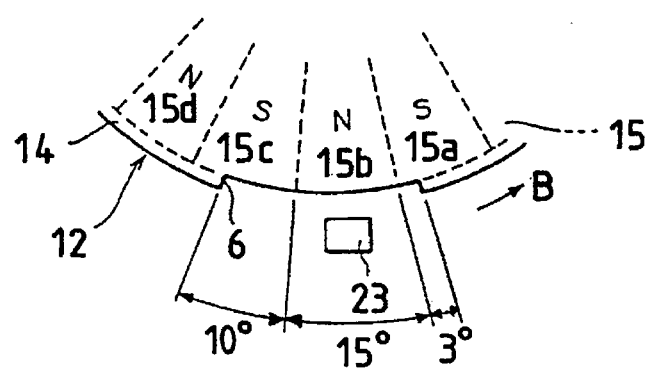
FIG. 16 is a plan view of an essential part of a rotor shown in FIG. 15.

The rotor yoke 14 is provided with a recess 16 having a rectangular shape as viewed in side elevation and having a width or central angle of 28 deg. As shown in FIG. 16, the angles of the S pole 15a, the N pole 15b, and the S pole 15c adjacent to each other from the upstream side exposed to the recess 16 are set to 3 deg, 15 deg (the whole angle of the N pole 15b), and 10 deg, respectively, as reference values. Like the first preferred embodiment, the polarity shown is that on the lower side of the rotating magnet 15.

Figure 17A:
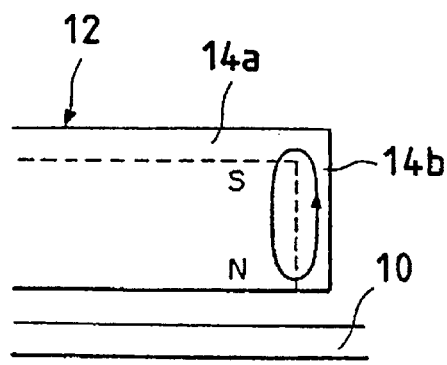
FIG. 17a is an enlarged side view of an unrecessed portion of a rotor yoke shown in FIG. 15, illustrating a magnetic flux distribution.
Figure 17B:
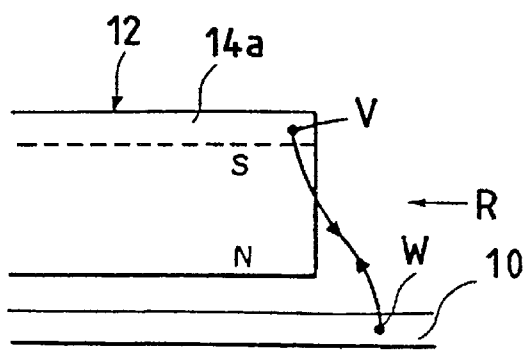
FIG. 17b is an enlarged side view of a recessed portion of the rotor yoke shown in FIG. 15, illustrating a magnetic flux distribution.
Figure 18:
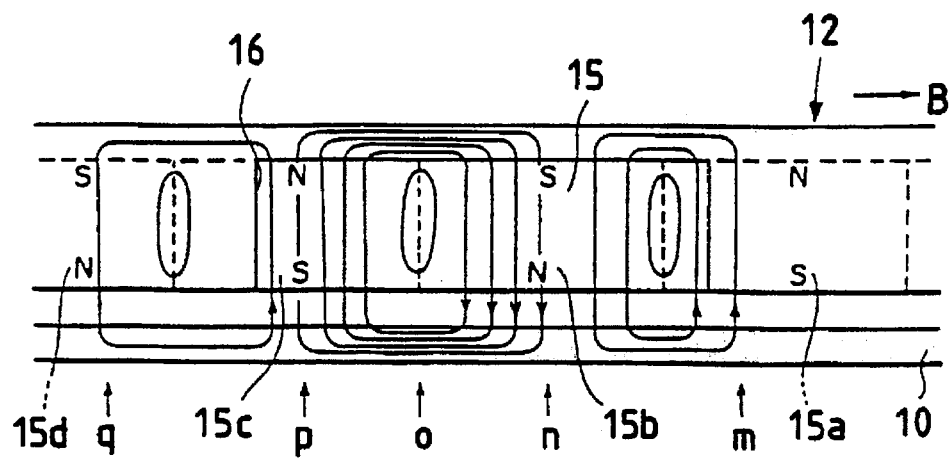
FIG. 18 is a fragmentary side view of the rotor yoke shown in FIG. 15 as viewed from the side opposed to the recess, illustrating a magnetic flux distribution.

If the recess 16 is absent as shown in FIG. 17a, most of the magnetic flux density generating from the rotating magnet 15 passes in the rotor yoke 14 having a small reluctance, so that there appears a Hall output from the Hall element 23 opposed to the outer circumference of the rotor 12 at a portion of the rotor yoke 14 where the recess 16 is absent. To the contrary, in the case where the recess 16 is present as shown in FIGS. 17b and 18, the magnetic flux at a portion of the rotating magnet 15 exposed to the recess 16 is partially leaked to a position where the Hall element 23 is disposed. That is, some of the magnetic flux generating from the rotating magnet 15 reaches the stator 10 constructed of a silicon steel plate having a small reluctance as a base. In FIG. 17b, a loop of the magnetic flux is not shown because an upper part (point v) and a lower part (point w) of the magnetic flux are perpendicular to the sheet of the figure. However, as apparent from FIG. 18 showing a magnetic flux distribution as viewed from the direction depicted by an arrow R in FIG. 17b, the magnetic flux is looped also at a portion of the rotating magnet 15 exposed to the recess 16.

Figure 19:
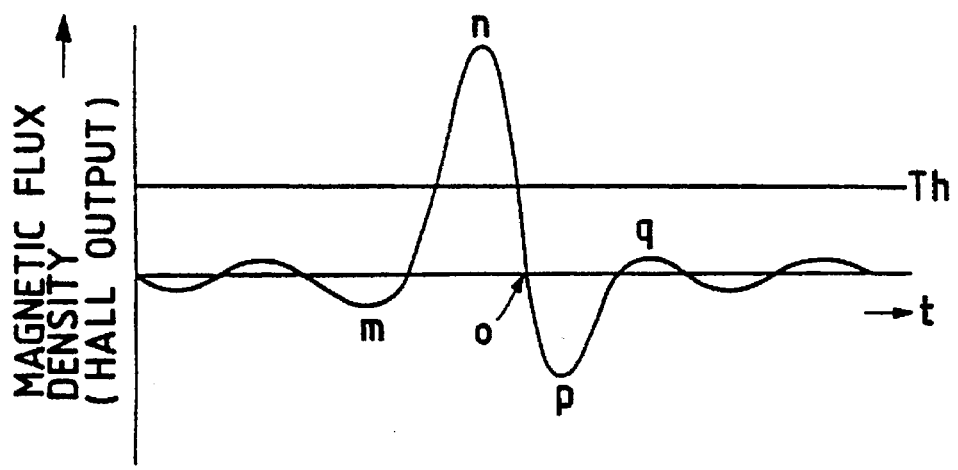
FIG. 19 is a graph showing the detection characteristic of a Hall element when the rotor shown in FIG. 15 is rotated.
Figure 20:
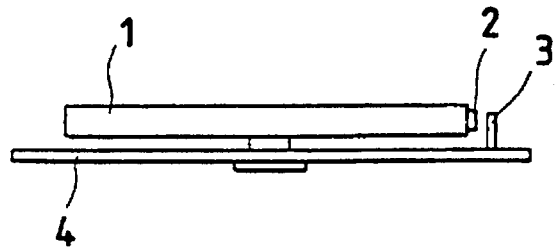
FIG. 20 is a side view of a conventional motor provided with index detecting means.
Figure 21:
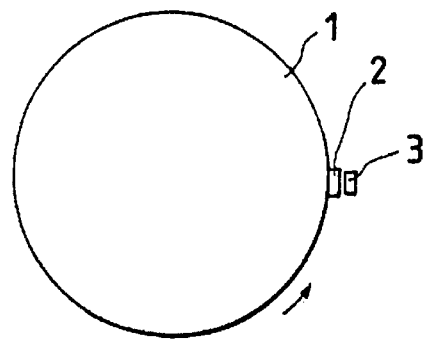
FIG. 21 is a plan view of the motor shown in FIG. 20.

In the motor according to the third preferred embodiment mentioned above, when the rotor 12 is rotated in the direction B shown in FIGS. 16 and 18, the Hall element 23 detects a component of the magnetic flux perpendicular to the rotational surface of the rotor 12 to obtain the detection characteristic as shown in FIG. 19. Assuming that the magnetic flux density (Hall output) directed from the back side of the sheet of FIG. 16 to the front side thereof is on the plus side, a relatively small output on the minus side (e.g., a magnetic flux density of −3 G) is obtained at a point m where the S pole 15a is opposed to the front of the Hall element 23, and a maximum output on the plus side (e.g., a magnetic flux density of 68 G) is obtained at a point n where the N pole 15b is opposed to the front of the Hall element 23. At a boundary point (point o) between the N pole 15b and the S pole 15c, no output is obtained. At a point p where the S pole 15c is opposed to the front of the Hall element 23, a relatively large output on the minus side (e.g., a magnetic flux density of −50 G) is obtained. At a point q where the N pole 15d is opposed to the front of the Hall element 23, a slight output on the plus side is obtained. However, the magnetic flux density at the point q actually becomes an output on the minus side such as −2 G. This is due to the following fact. Since the N pole 15d is entirely covered with the rotor yoke 14, the magnetic flux from the N pole 15d hardly leaks out of the rotor yoke 14. In contrast, the magnetic flux generating from the N pole 15b entirely exposed to the recess 16 and passing through the stator yoke into the S pole 15c is much to have an influence at the point q.

Since the Hall element 23 detects a component of the magnetic flux perpendicular to the rotational surface of the rotor 12, the Hall element 23 is not affected by the magnetic flux directed outward from the rotor yoke 14 into the recess 16 as shown by the magnetic flux C in FIG. 4. In other words, the Hall element does not detect any overshoot.

The Hall element 23 is connected to a detecting circuit as shown in FIG. 5. In the detecting circuit, a zero cross point (point o) where the Hall output becomes zero after it once exceeds the threshold Th is detected as an index position similarly to the first preferred embodiment.

In the third preferred embodiment, the reason why the N pole 15b is exposed at its whole angle of 15 deg to the recess 16 is to obtain a maximum magnetic flux density (Hall output) on the plus side from the N pole 15b. The reason why the S pole 15a adjacent to the N pole 15b on the upstream side is exposed at a slight angle (3 deg) to the recess 16 is to securely expose the N pole 15b at its whole angle to the recess 16 and thereby reliably obtain a maximum magnetic flux density on the plus side even if variations in individual sizes of the rotating magnet 15 and the rotor yoke 14 and variations in assembling of both members become worst within a tolerance. In other words, the reason is to prevent that the exposure angle of the N pole 15b is reduced because of the variations to result in a decrease in level of the maximum magnetic flux density. As shown by the point m in FIG. 19, the magnetic flux density (Hall output) from the S pole 15a is on the minus side. Therefore, even if the angle of exposure of the S pole 15a to the recess 16 is increased to the whole angle of 15 deg to increase the level of the magnetic flux density at the point m, there is no problem in performing the index detection.

The reason why the amount of exposure of the S pole 15c to the recess 16 is set to a relatively large angle of 10 deg is to obtain a large magnetic flux density on the minus side at the point p shown in FIG. 19, thereby ensuring the generation of the zero cross point. The larger the amount of exposure of the S pole 15c to the recess 16, the larger the level of the magnetic flux density on the minus side. Accordingly, an ideal exposure angle of the S pole 15c is 15 deg which is the whole angle of one pole. If the exposure angle of the S pole 15c is set to 15 deg as a reference value, there is a case where the N pole 15d adjacent to the S pole 15c on the downstream side may be also exposed to the recess 16 because of variations in individual sizes of the rotating magnet 15 and the rotor yoke 14 and the variations in assembling of both members. In this case, the magnetic flux density from the N pole 15d becomes the plus side as shown by the point q in FIG. 19. Although the level of the magnetic flux density at the point q is lower than the maximum level at the point n, there is no room in setting the threshold Th when considering variations in sensitivity of the Hall element 23, etc., and in the worst case, there is a possibility that the level at the point q may exceed the threshold Th to cause erroneous index detection. Thus in the third preferred embodiment, in order to prevent such erroneous index detection and allow the output at the point p to appear on the minus side, thereby reliably obtaining the zero cross point, the amount of exposure of the S pole 15c to the recess 16 is set to 10 deg as a reference value. However, in consideration of variations in size of each component of the rotor 12, an ideal reference angle of the S pole 15c exposed to the recess 16 is 13 deg.

Although the S pole 15a may be exposed at its whole angle to the recess 16 as mentioned above, variations in size of each component of the rotor 12 must also be considered in setting the exposure amount of the S pole 15a. Therefore, as similar to the S pole 15c, it is preferable to set the maximum exposure angle of the S pole 15a to the recess 16 to 13 deg as a reference value. In the case where there are no variations in size, the maximum exposure angle of the rotating magnet 15 to the recess 16 is 45 deg (total angle of three poles), i.e., the total of the whole angles of the S pole 15a, the N pole 15b, and the S pole 15c all entirely exposed to the recess 16. However, in consideration of the variations in size of each component of the rotor 12, the maximum exposure angle becomes 41 deg as the total of the exposure angle 13 deg of the S pole 15a, the exposure angle 15 deg of the N pole 15b, and the exposure angle 13 deg of the S pole 15c. This angle 41 deg (about 2.73 times the whole angle of one pole) is an ideal allowable maximum exposure angle.

In the third preferred embodiment of the present invention mentioned above, since the whole of the N pole 15b is exposed to the recess 16, a maximum output on the plus side can be obtained from the Hall element 23 at the point n where the N pole 15b is opposed to the front of the Hall element 23. Further, since the S pole 15c is exposed at a relatively large angle of 10 deg to the recess 16, an output on the minus side can be always obtained at the point p to thereby reliably obtain the zero cross point. Further, even if there are variations in size of each component of the rotor 12 including the rotating magnet 15 and the rotor yoke 14 formed with the recess 16 and variations in assembling of these members, the output level at the point q can be suppressed because the N pole 15d adjacent to the S pole 15c on the downstream side is not exposed to the recess 16, with the result that the ratio in level between the point n and the point q can be made large. Accordingly, by suitably setting the threshold Th in the manufacturing steps, the need of adjustment of individual thresholds can be eliminated to thereby ensure the detection of one index per revolution of the rotor.

The reason why the amount of exposure of the S pole 15c to the recess 16 can be set to a large angle of 10 deg is that the magnetic flux to be detected by the Hall element 23 is a component of the magnetic flux perpendicular to the rotational surface of the rotor 12 and there is no influence of the overshoot as mentioned in the simulation of the first preferred embodiment.

Further, since the Hall element 23 is provided with the collecting yoke formed of a ferromagnetic material such as ferrite, the magnetic flux is collected to the detecting portion of the Hall element 23 by the collecting yoke, thereby obtaining a large output from the Hall element 23.

Although each preferred embodiment mentioned above has been directed to the motor including the 24-pole rotating magnet 15 composed of N poles and S poles magnetized each at 15 deg, the present invention is not limited to such a motor. For example, the present invention may be applied to a motor including a 18-pole rotating magnet composed of N poles and S poles magnetized each at 20 deg or a 30-pole rotating magnet composed of N poles and S poles magnetized each at 12 deg. Further, although the Hall element is used as a magnetic sensor in the first to third preferred embodiments, another type of magnetic sensor such as a magnetoresistive element (MR element) may be used to detect a rotational position of the rotor in the present invention.

What is claimed is:

1. A motor comprising:

a stator, a rotor including a rotor yoke and a ring-shaped magnet mounted on the rotor yoke, the ring-shaped magnet having an outer periphery and being sectioned into a plurality of N poles and S poles having widths alternately arranged around the outer periphery, the rotor yoke having a side surface covering the outer periphery, said side surface of said rotor yoke defining a recess through which a part of said outer periphery of said ring-shaped magnet is exposed, and magnetic detecting means mounted on the stator and located adjacent said side surface of said rotor yoke for detecting a rotational position of a rotor by sensing magnetic flux emitted from the recess formed in said rotor yoke;

wherein a width of said recess is greater than the width of one of said N poles and said S poles of said ring-shaped magnet, wherein an entire width of a first pole of said N poles and said S poles and a partial width of a second pole adjacent to said first pole on a downstream side of said rotor are exposed through said recess, and wherein said magnetic detecting means comprises a detecting element disposed adjacent said side surface of said rotor yoke for detecting a radial component of said magnetic flux generating from said ring-shaped magnet, and an amount of exposure of said second pole to said recess is set within 46% of the width of one of said N poles and said S poles.

2. A motor comprising:

a stator, a rotor including a rotor yoke and a ring-shaped magnet mounted on the rotor yoke, the ring-shaped magnet having an outer periphery and being sectioned into a plurality of N poles and S poles having widths alternately arranged around the outer periphery, the rotor yoke having a side surface covering the outer periphery, said side surface of said rotor yoke defining a recess through which a part of said outer periphery of said ring-shaped magnet is exposed, and magnetic detecting means mounted on the stator and located adjacent said side surface of said rotor yoke for detecting a rotational position of a rotor by sensing magnetic flux emitted from the recess formed in said rotor yoke;

wherein a width of said recess is greater than the width of one of said N poles and said S poles of said ring-shaped magnet, wherein an entire width of a first pole of said N poles and said S poles and a partial width of a second pole adjacent to said first pole on a downstream side of said rotor are exposed through said recess, and wherein said magnetic detecting means comprises a detecting element disposed adjacent said side surface of said rotor yoke for detecting a radial component of said magnetic flux generating from said ring-shaped magnet, and said recess has a nonrectangular shape.

3. A motor according to claim 2, wherein said nonrectangular shape comprises a trapazoidal shape.

* * * * *